(12) United States Patent
Hashem (10) Patent No.: US 6,971,685 B2
(45) Date of Patent: Dec. 6, 2005

(54) MULTI-POINT HIGH PRESSURE SEAL FOR EXPANDABLE TUBULAR CONNECTIONS

(75) Inventor: Ghazi J. Hashem, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 126 days.

(21) Appl. No.: 10/455,655

(22) Filed: Jun. 5, 2003

(65) Prior Publication Data

US 2003/0234538 A1    Dec. 25, 2003

Related U.S. Application Data (60) Provisional application No. 60/391,030, filed on Jun. 24, 2002.

(51) Int. Cl.[7] .............................................. F16L 17/00
(52) U.S. Cl. ........................ 285/333; 285/390; 285/382
(58) Field of Search ........................... 285/92, 333, 334, 285/382, 390, 355

(56) References Cited

U.S. PATENT DOCUMENTS

| | | | | |
|---|---|---|---|---|
| 2,980,451 | A |   | 4/1961 | Taylor et al. ............. 285/332.3 |
| 3,047,316 | A |   | 7/1962 | Wehring et al. ............. 285/334 |
| 3,870,351 | A | * | 3/1975 | Matsuki ....................... 285/334 |
| 3,989,284 | A |   | 11/1976 | Blose ....................... 285/332.2 |
| 4,253,687 | A | * | 3/1981 | Maples ..................... 285/332.3 |
| 4,648,627 | A |   | 3/1987 | Reimert ......................... 285/24 |

(Continued)

FOREIGN PATENT DOCUMENTS

EP    0127560    1/1990

(Continued)

OTHER PUBLICATIONS

General Administrative and Export Office. Atlas Bradford Company. p. 1. (1970-1971).

(Continued)

*Primary Examiner*—Eric K. Nicholson
(74) *Attorney, Agent, or Firm*—Howrey LLP (57) ABSTRACT

An expandable threaded connection between segments of expandable tubulars that provides multiple sealing points along the pin and box members that can withstand high pressure is disclosed. The present invention utilizes a gap that is created between the pin nose and the back of the box member when the threaded connection is made up and a reverse trapping angle machined into the pin nose end and the back of the box. The radial expansion of the tubulars causes axial movement of the pin nose and the box member until the pin nose is in contact with the back of the box member, thereby closing the gap and forcing the pin nose into sealing engagement with the back of the box member. The reverse trapping angle forces the nose of the pin member outwardly (i.e., toward the outer diameter of the expandable tubular string) as it is forced into contact with the back of the box member during the expansion process. The force imparted on the pin nose by the reverse trapping angle creates a high pressure radial seal between surfaces of the pin member and the box member. The contact point between the nose of the pin member and the back of the box member creates a high pressure axial seal. By controlling the initial gap size and the reverse trapping angle, the present invention ensures that the axial and radial sealing points are strengthened by the expansion process. The combination of the radial and axial seals created by the expansion process provides an expanded threaded connection that is capable of withstanding high pressure.

30 Claims, 4 Drawing Sheets

U.S. PATENT DOCUMENTS

| | | | |
|---|---|---|---|
| 4,676,529 A * | 6/1987 | McDonald | 285/92 |
| 4,703,959 A | 11/1987 | Reeves et al. | 285/332.3 |
| 4,707,001 A | 11/1987 | Johnson | 285/332.3 |
| 4,822,081 A | 4/1989 | Blose | 285/334 |
| 4,958,862 A * | 9/1990 | Cappelli et al. | 285/334 |
| 5,415,441 A | 5/1995 | Kilgore et al. | 285/322 |
| 5,427,418 A | 6/1995 | Watts | 285/94 |
| 5,924,745 A | 7/1999 | Campbell | 285/90 |
| 5,954,374 A | 9/1999 | Gallagher et al. | 285/332 |
| 5,984,568 A | 11/1999 | Lohbeck | 403/375 |
| 6,042,153 A | 3/2000 | DeLange | 285/55 |
| 6,123,368 A | 9/2000 | Enderle | 285/334 |
| 6,273,474 B1 | 8/2001 | DeLange | 285/55 |
| 6,322,109 B1 | 11/2001 | Campbell et al. | 285/92 |
| 6,409,175 B1 | 6/2002 | Evans et al. | 277/314 |
| 6,604,763 B1 * | 8/2003 | Cook et al. | 285/355 |
| 6,607,220 B2 * | 8/2003 | Sivley, IV | 285/334 |
| 6,619,696 B2 * | 9/2003 | Baugh et al. | 285/92 |
| 6,695,012 B1 * | 2/2004 | Ring et al. | 138/90 |
| 6,712,401 B2 * | 3/2004 | Coulon et al. | 285/331 |
| 6,722,443 B1 * | 4/2004 | Metcalfe | 166/384 |
| 2002/0021006 A1 * | 2/2002 | Mallis | 285/334 |
| 2002/0163192 A1 | 11/2002 | Goulon et al. | 285/331 |
| 2003/0067166 A1 * | 4/2003 | Sivley | 285/333 |
| 2003/0168858 A1 * | 9/2003 | Hashem | 285/334 |
| 2004/0017081 A1 * | 1/2004 | Simpson et al. | 285/333 |
| 2004/0104575 A1 * | 6/2004 | Ellington et al. | 285/333 |
| 2004/0174017 A1 * | 9/2004 | Brill et al. | 285/333 |

FOREIGN PATENT DOCUMENTS

| | | |
|---|---|---|
| EP | 1106778 | 6/2001 |
| EP | 2361724 | 10/2001 |
| WO | WO98/42947 | 3/1998 |
| WO | WO01/04520 | 1/2001 |

OTHER PUBLICATIONS

Robert E. Snyder. "How Shell Completes Deep Smackover Sour Gas Wells". pp. 85-88. (Oct. 1971).

Scott et al. "VAM-PRO A Premium That Cuts Rig Operational Costs," *World Oil,* pp. 103-146 (Oct. 1995).

Scott, et al. "2002 Tubing Reference Tables," *World Oil,* pp. T-3-T-10 (Jan. 2002).

Hydril Series 500. "The Wedge Thread". Hydril Tubular Products Division. pp. 1-5.

* cited by examiner

MULTI-POINT HIGH PRESSURE SEAL FOR EXPANDABLE TUBULAR CONNECTIONS

This application claims the benefit of U.S. Provisional Application No. 60/391,030, filed Jun. 24, 2002.

FIELD OF THE INVENTION

The present invention relates to threaded tubular connections particularly useful in the oil and gas industry. In particular, the invention relates to an expandable tubular threaded connection having axial and radial sealing points formed as a result of the tubular expansion process that allow the threaded connection to withstand high pressure after expansion.

BACKGROUND OF THE INVENTION

In the conventional drilling of an oil and gas well, a series of tubulars, typically strings of casing, liner, and/or screen segments connected together, are sequentially installed in the well bore until the depth of the producing zone of the formation is reached. Standard practice requires that each succeeding string of tubulars placed in the well bore has an outside diameter smaller than the preceding string of tubulars and/or bore hole such that the tubular segments can be passed through the preceding string of tubulars and/or bore hole to their downhole location. The reduction in the diameter of each successive string of tubular segments placed in the well bore results in a significant reduction in the diameter of the tubular through which hydrocarbons can be carried to the surface. More importantly, to achieve the desired tubular diameter in the producing zone, the initial bore hole size at the surface must be sufficiently large to allow for a large diameter casing. The large initial bore hole size requires increased drilling time and increased material costs, including increased use of materials such as drilling mud and casing cement.

The technology of expandable tubulars addresses these shortcomings in the conventional casing/liner/screen hanging operations. Technology that allows the permanent expansion of tubulars in oil and gas wells is reliable, cost effective, and is growing rapidly. Through radial expansion of successive strings of tubular segments until the outer wall of those segments contacts the inner wall of the host pipe, it is possible to create a tight fit between the expandable tubulars and the host pipe that holds the tubular segments in place and creates an annular seal. Further, it is possible to achieve a well bore of virtually uniform diameter (i.e., a monobore well). The expandable tubulars are radially expanded by various means known in the art, including, but not limited to, pulling or pushing fixed diameter expansion cones through the tubular, extruding the tubular off of a hydraulically-actuated expansion tool, or rotating an expansion tool while pulling or pushing it through the tubular.

The tubular segments to be expanded are typically coupled together using threaded connections in which the male end, or pin member, of one tubular is threadably connected to the female end, or box member, of an adjacent tubular. Alternatively, the ends of the adjacent tubulars may have a pin member at each end, with the box member being formed by a short coupling threaded onto one of the pin members. When a conventional threaded connection is made up, the nose of the pin member is in contact with the back of the box member. This threaded engagement between properly secured pin and box members creates a conventional tubular joint that effectively maintains a secure mechanical connection that holds the tubular segments together and that effectively seals the internal tubular area from the formation and vice versa. Often, the sealing ability of the threaded engagement is augmented through the use of Teflon® rings or other deformable seal rings entrapped in the thread area.

Problems have arisen, however, at the threaded connection point between tubular segments during and after expansion when using conventional threaded tubular connections and seals currently available in the industry. When the tubular string is radially expanded, a conventional threaded connection changes dimensionally in a way that can prevent the pin and box members from maintaining proper engagement and sealing. The radial expansion of a conventional threaded connection can cause the pin and box members to radially separate, thereby causing the seal of the threaded engagement to fail. In effect, the radial expansion disables the seal that is created by the metal-to-metal engagement of the sealing surfaces of the pin and box members, and degrades or lowers the pressure holding integrity of the connections. The threaded connection point thus becomes a source of potential leaks during and after expansion of the tubular string.

Conventional threaded connections that use an elastomeric seal ring between the engaged surfaces of the pin and box members may also leak when the threaded connection is radially expanded. Typically, the elastomeric seal ring of a conventional threaded connection is carried in an annular groove formed in either the pin or box member, or both. The elastomeric seal ring creates a seal when it is "energized" by being radially compressed between the engaged pin and box members during make up of the connection. Radial expansion of the threaded connection, however, changes the radial compression of the elastomeric seal ring, thereby potentially allowing leakage through the threaded connection.

Additionally, the radial expansion of the tubular string causes the pin and box members to undergo axial movement. The amount of axial movement experienced by the pin and box members is dependent on numerous factors, including, but not limited to, the amount of radial expansion of the tubular string and the geometry of the threaded connection (e.g., whether the pin and box members have any thin wall sections). Because conventional threaded connections have the pin nose in contact with the back of the box member upon make up, the axial movement of the pin and box members causes the pin and box members to impart significant stresses on each other.

The significant stresses experienced by the pin and box members can cause several additional problems associated with the radial expansion of conventional threaded connections. First, as it is forced into contact with the box member, the pin nose may be forced inwardly, thereby potentially causing an obstruction in the inner diameter of the expanded tubular. Such an obstruction can severely hamper an operator's ability to insert and/or remove downhole tools from the tubular string. Second, if the axial movement of the pin and box members is great enough, the force exerted on the pin nose may be sufficient to cause the pin nose to buckle, thereby weakening the strength of the threaded connection. Whether the pin nose is forced inwardly or caused to buckle, the contact point between the pin member and box member becomes a potential source for leaks in the tubular string. Third, the stress imparted on the pin and box members may cause splitting along the length of the pin or box at any thin wall sections, thereby weakening the strength of the threaded connection and creating a potential source of leaks.

As deeper wells and more difficult completions are attempted using expandable tubulars, the threaded connections that hold the expandable tubulars together must address these known problems and must be able to accommodate the higher pressures faced in such applications. What is needed is a threaded connection for expandable tubulars that enhances the pressure integrity of the connections so that they will withstand high pressure after expansion, while not weakening the coupling strength of the connections or causing an obstruction in the inner diameter of the expanded tubular. It is an object of the present invention to provide an apparatus and method for creating a threaded connection between segments of expandable tubulars that enhances the pressure integrity of the expanded connection while not weakening the coupling strength of the connection or causing an obstruction in the inner diameter of the expanded tubular. Those and other objectives will become apparent to those of skill in the art from a review of the specification below.

SUMMARY OF THE INVENTION

An expandable threaded connection between segments of expandable tubulars that provides multiple sealing points along the pin and box members that can withstand high pressure is disclosed. The present invention is a unique expandable threaded connection in which expansion of the tubulars creates an axial and radial seal between the pin and box members. The invention utilizes a gap that is created between the pin nose and the back of the box member when the threaded connection is made up. The radial expansion of the tubulars causes axial movement of the pin nose and/or the back of the box member until the pin nose is in contact with the back of the box member, thereby closing the gap and forcing the pin nose into sealing engagement with the back of the box member. The use of a gap of a predetermined size allows for control of the stresses imparted on the pin nose and the back of the box member such that buckling of the pin nose or splitting along the length of the pin or box at any thin wall sections is prevented.

Additionally, the back of the box member may include a reverse trapping angle that forces the nose of the pin member radially outwardly (i.e., toward the outer diameter of the expandable tubular string) as it is forced into contact with the box member during the expansion process. The force imparted on the pin nose by the reverse trapping angle creates a high pressure radial seal between surfaces of the pin member and the box member. The contact point between the nose of the pin member and the back of the box member creates a high pressure axial seal. By controlling the initial gap size between the pin nose and the back of the box member, the disclosed invention ensures that these axial and radial sealing points are strengthened by the expansion process. The combination of the radial and axial seals created by the expansion process provides an expandable threaded connection that is capable of withstanding high pressure.

In an alternative embodiment of the invention, an elastomeric sealing ring can be inserted in a groove in the back of the box member such that the sealing ring engages the pin nose as the pin nose and/or box member undergo axial movement. The axial movement forces the pin nose into contact with the elastomeric seal, creating additional, unique axial and radial sealing points in the expandable threaded connection. When energized through contact with the pin nose during the radial expansion process, the elastomeric sealing ring provides a high-pressure seal against leakage caused by the internal pressure within the tubular.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1:
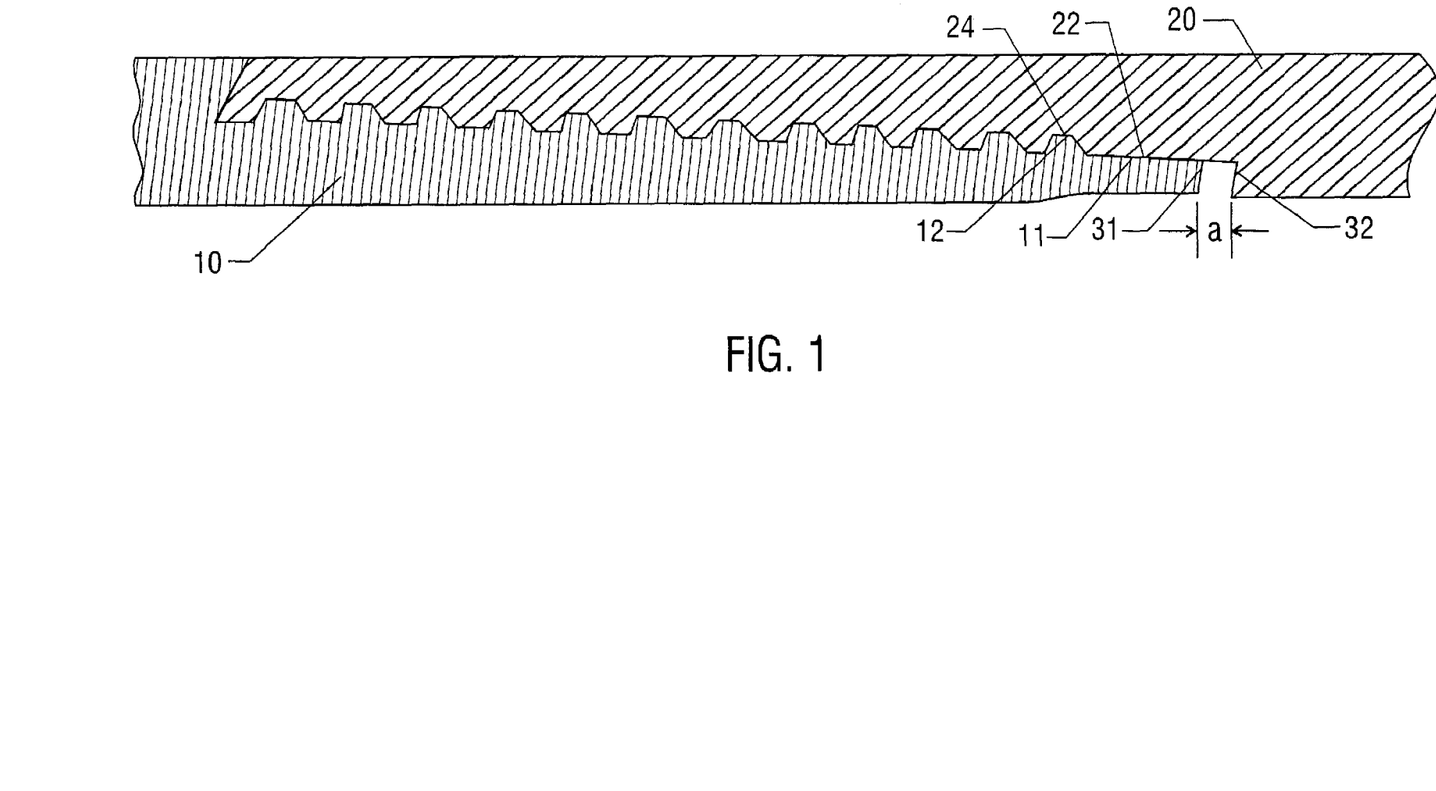
FIG. 1 is a side view of an expandable threaded connection for expandable tubulars according to one embodiment of the present invention prior to expansion of the tubulars.

Referring to FIG. 1, an expandable threaded connection according to the present invention is shown fully made up. The expandable threaded connection of FIG. 1 includes pin member 10 and box member 20 on adjacent segments of expandable tubulars. Pin member 10 includes helical threads 12 extending along its length. Box member 20 includes helical mating threads 24 that are shaped and sized to mate with helical threads 12 respectively on pin member 10 during make-up of a threaded connection between separate tubular joints or segments. The interengaged threads of pin member 10 with the corresponding threads of box member 20 on an adjacent joint provide a threaded connection upon final make-up. In this way, multiple segments of expandable tubulars can be threadably connected.

The helical threads can be machined on plain end tubulars, tubulars with both ends upset, tubulars with one plain end and one upset end, or other connection types as typically used in the oil and gas industry. Additionally, the threads can be selected from a broad range of thread types used in the industry. One of skill in the art can appreciate that the present invention is not limited in application to only certain kinds of tubular ends or thread types.

The expandable threaded connection of FIG. 1 is shown prior to radial expansion of the expandable tubulars. When the expandable threaded connection is made up, pin surface 11 and box surface 22 are in contact. Conversely, pin nose end 31 (located at the end of the pin member 10) and angled box surface 32 (located at the back of the box member 20)

are not in contact when the expandable threaded connection is made up. Axial gap (a) separates pin nose end 31 and angled box surface 32 when the connection is made up.

Figure 2:
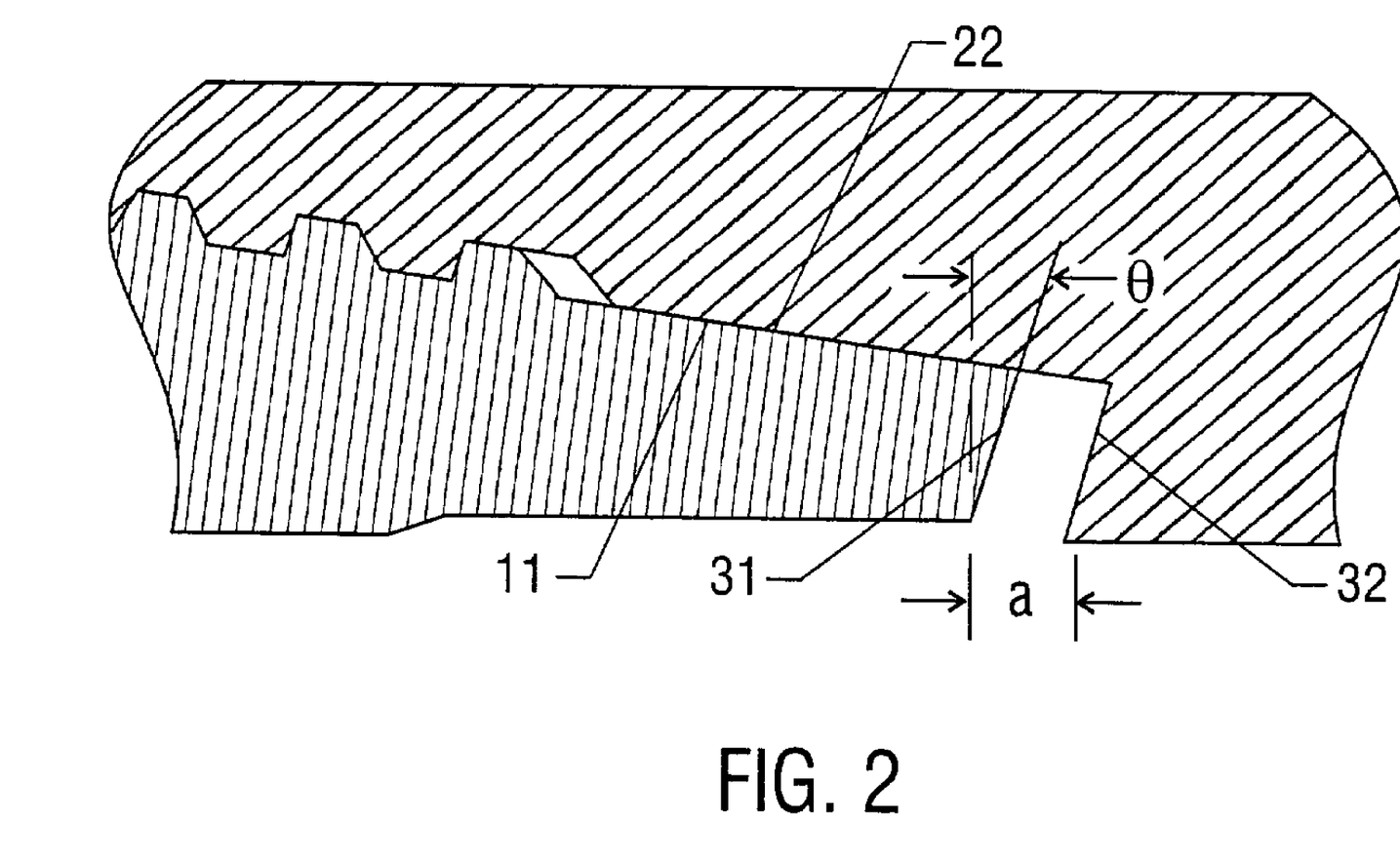
FIG. 2 is an enlarged view of the area of the axial gap shown in FIG. 1 prior to expansion of the tubulars.

FIG. 2 shows an enlarged section of the area of axial gap (a). During the radial expansion operation, pin member 10 and box member 20 will undergo axial movement. The axial movement of pin member 10 and box member 20 causes the axial gap (a) to narrow, causing increased wedging force between pin surface 11 and box surface 22 and, thus, increasing the bearing pressure between those surfaces. Towards the end of the radial expansion operation, the axial movement of the pin and box members will cause the axial gap (a) to close, allowing pin nose end 31 to sealing engage angled box surface 32.

FIG. 2 also shows a reverse trapping angle (θ) incorporated into angled box surface 32 and pin nose end 31. As shown, pin nose end 31 and angled box surface 32 have been machined with substantially equal trapping angles (θ). Reverse trapping angle (θ) is preferably in the range of 15–25 degrees. The reverse trapping angle (θ) on pin nose end 31 is matched to a substantially equal angle (θ) on angled box surface 32. The above range of degrees for reverse trapping angle (θ) is given by way of example only. One of skill in the art will recognize that the actual measurement of reverse trapping angle (θ) can vary greatly depending on numerous characteristics, including, but not limited to, the material of the expandable tubulars, the wall thickness of the pin and box members of the threaded connection, and the amount of radial expansion of the expandable tubulars.

Figure 3:
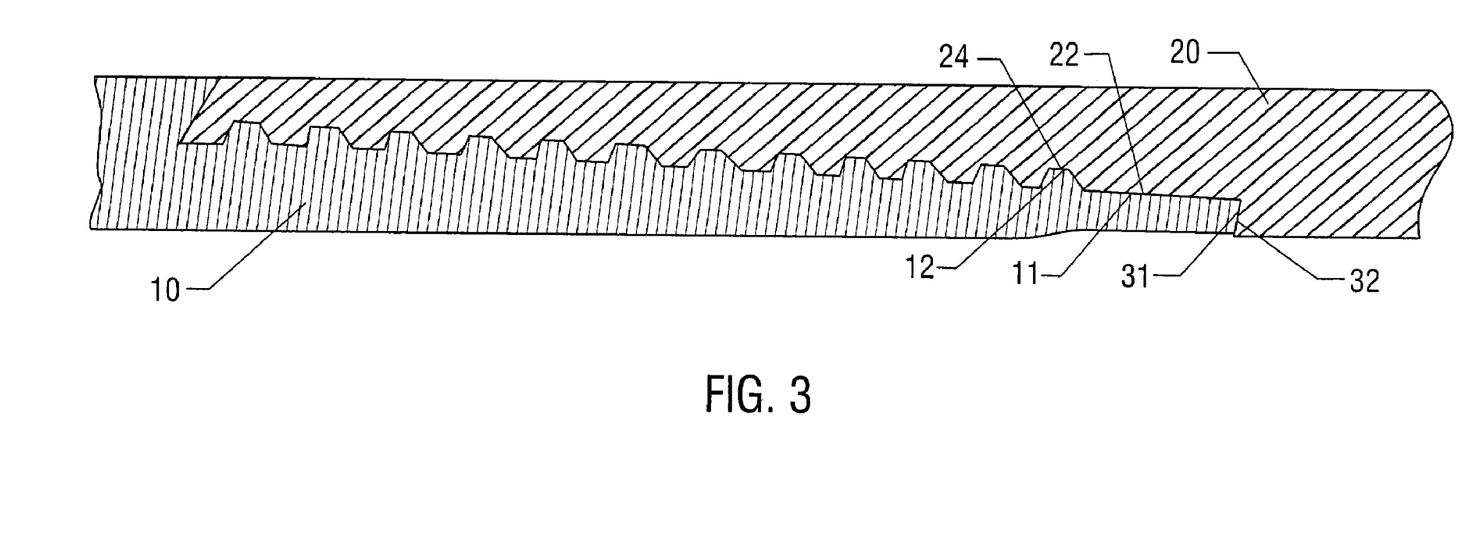
FIG. 3 is a side view of an expandable threaded connection for expandable tubulars according to one embodiment of the present invention after expansion of the tubulars.

Reverse trapping angle (θ) is designed to expand pin nose end 31 radially outwardly as it is forced into contact with angled box surface 32 by the axial movement of the pin and box members. As pin nose end 31 is forced in an outwardly direction, the bearing pressure between pin surface 11 and box surface 22 is increased. A larger trapping angle will cause higher bearing pressure between those surfaces. Both the increased bearing pressure caused by the axial wedging-movement (noted above) and the additional bearing pressure caused by the forces acting on the surfaces at the trapping angles will produce a radial metal-to-metal seal between pin surface 11 and box surface 22. FIG. 3 shows the metal-to-metal seal between pin surface 11 and box surface 22 after expansion of the expandable threaded connection. This high strength radial metal-to-metal seal is capable of handling the high pressures associated with deep wells.

Additionally, after the radial expansion operation is complete, the axial movement of pin nose end 31 and angled box surface 32 have forced them into sealing contact. The axial force acting on pin nose end 31 and angled box surface 32 creates an axial metal-to-metal seal between the two surfaces. Thus, when the radial expansion operation is complete, the threaded connection will have two metal-to-metal seals (a radial seal and an axial seal) in the proximity of the pin nose and the back of the box as described above. The two seals will be the product of the expansion operation and will allow the expandable threaded connection to exhibit good leak resistance at high pressure.

By controlling the initial gap size between the pin nose and the back of the box member and by selecting the appropriate trapping angle, the disclosed invention ensures that the axial and radial metal-to-metal sealing points are strengthened by the expansion process. The initial size of axial gap (a) will be predetermined for different threaded connections and is dependent on several factors, including, but not limited to, the geometry of the threaded connection before expansion, the amount of radial expansion, and the tubular materials to be expanded. One of skill in the art will recognize that the actual size of the axial gap (a) can vary greatly depending on the factors listed above.

The axial gap (a) is unique and separates the present invention from other threaded connections and alleviates the known problems with those connections. In particular, the use of an axial gap (a) of a pre-determined size allows for control of the stresses imparted on the pin nose and the back of the box member such that buckling of the pin nose or splitting along the length of the pin or box at any thin wall sections is prevented.

One of skill in the art will recognize that alternative embodiments of the present invention may not utilize a reverse trapping angle. Such alternative embodiments will still realize the benefits of the present invention through proper sizing and design of the axial gap (a). Additionally, one of skill in the art will recognize that alternative embodiments of the present invention may utilize a pin nose end and a box member of various shapes. The pin nose end and box member can have matching shapes designed to "mate" upon the axial movement of the pin and box members during the expansion process.

Figure 4:
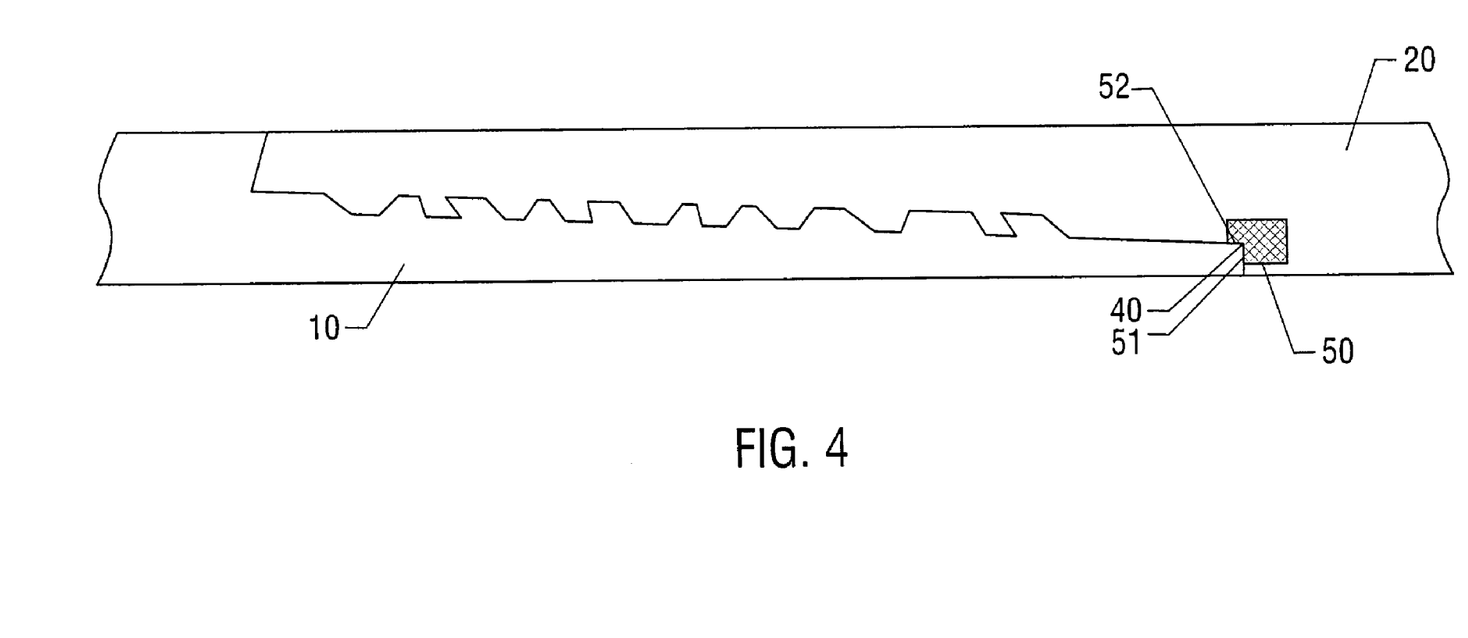
FIG. 4 is a side view of an expandable threaded connection for expandable tubulars according to one embodiment of the present invention in which an elastomeric sealing ring is placed in a groove in the back of the box member of the threaded connection.

In an alternative embodiment of the invention shown in FIG. 4, an elastomeric sealing ring 50 can be inserted in a groove in the back of the box member 20 such that a portion of the pin nose 40 engages the sealing ring 50 as the pin nose 40 and box member 20 undergo axial movement. The axial movement of the pin nose 40 into contact with the elastomeric sealing ring 50 creates an additional axial sealing point 51 and an additional radial sealing point 52 in the expandable threaded connection. In effect, the use of the elastomeric seal creates a four-point seal in which the axial and radial metal-to-metal seals discussed in the preceding paragraphs work in conjunction with the axial metal-to-elastomer seal and the radial metal-to-elastomer seal created by the pin nose 40 engaging the elastomeric sealing ring 50. The elastomeric sealing ring 50 can be selected from any suitable downhole sealing material known in the industry, and can be shaped and sized to effect the greatest possible sealing arrangement.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An expandable threaded tubular connection comprising:
   a first tubular segment with a pin member, the pin member including a pin surface, interengageable thread means and a pin nose end;
   a second tubular segment with a box member, the box member including a box surface and interengageable thread means suitable for threadedly engaging said pin member;
   an axial gap between said pin nose end and the back of said box member, said axial gap created upon threadedly engaging said pin member and said box member;
   wherein said axial gap is sized to allow said pin nose end to engage the back of said box member upon axial movement of said pin member and said box member during radial expansion of the threaded tubular connection.

2. The expandable threaded tubular connection of claim 1 wherein the box member has an angled surface at the back of said box member.

3. The expandable threaded tubular connection of claim 2 wherein the pin nose end has an angled surface designed to mate with the angled surface at the back of the box member.

4. The expandable threaded tubular connection of claim 3 wherein the angled surface at the back of the box member and the angled surface at the pin nose end are in contact with each other after the axial gap is closed upon axial movement of said pin member and said box member during radial expansion of the threaded tubular connection.

5. The expandable threaded tubular connection of claim 4 wherein the pin nose end is forced radially outwardly when in contact with the angled surface of the box member after the axial gap is closed upon axial movement of said pin member and said box member during radial expansion of the threaded tubular connection.

6. The expandable threaded tubular connection of claim 5 wherein the closing of the axial gap upon axial movement of the pin member and the box member during radial expansion of the threaded tubular connection creates a seal between the pin surface and the box surface.

7. The expandable threaded tubular connection of claim 1 wherein the closing of the axial gap upon axial movement of the pin member and the box member during radial expansion of the threaded tubular connection creates a seal between the pin nose end and the back of the box member.

8. The expandable threaded tubular connection of claim 1 wherein the pin nose end and the back of the box member have matching shapes designed to mate upon axial movement of the pin member and the box member during radial expansion of the threaded tubular connection.

9. The expandable threaded tubular connection of claim 4 wherein the pin nose end and the back of the box member have matching shapes designed to mate upon axial movement of the pin member and the box member during radial expansion of the threaded tubular connection.

10. The expandable threaded tubular connection of claim 1 wherein a sealing element is located at the back of the box member.

11. The expandable threaded tubular connection of claim 10 wherein the pin nose end engages the sealing element at the back of the box member upon axial movement of the pin member and the box member during radial expansion of the threaded tubular connection.

12. The expandable threaded tubular connection of claim 11 wherein the contact between the pin nose end and the sealing element at the back of the box member creates axial and radial sealing points.

13. The expandable threaded tubular connection of claim 10 wherein the sealing element is made from an elastomeric material.

14. The expandable threaded tubular connection of claim 10 wherein the axial gap provides a passageway that allows excess thread dope between the threads to be forced out of the interengaged thread area upon final make up of the threaded connection.

15. The expandable threaded tubular connection of claim 1 wherein the first tubular segment and the second tubular segment have plain ends.

16. The expandable threaded tubular connection of claim 1 wherein the first tubular segment and the second tubular segment have upset ends.

17. The expandable threaded tubular connection of claim 1 wherein the first tubular segment has a plain end and the second tubular segment has an upset end.

18. The expandable threaded tubular connection of claim 1 wherein the axial gap is sized to control the stresses imparted on the pin nose end and the back of the box member when the pin nose end and the back of the box member are forced into contact upon axial movement of the pin member and the box member during radial expansion of the threaded tubular connection.

19. An expandable threaded tubular connection comprising:
a first tubular segment with a pin member, the pin member including a pin surface, interengageable thread means and a pin nose end, said pin nose end having an angled surface;
a second tubular segment with a box member, the box member including a box surface, interengageable thread means suitable for threadedly engaging said pin member, and an angled surface at the back of the box member designed to mate with the angled surface of the pin nose end;
a sealing element located at the back of the box member;
an axial gap between said pin nose end and the back of said box member, said axial gap created upon threadedly engaging said pin member and said box member;
wherein said axial gap is sized to allow said pin nose end to engage the sealing element at the back of said box member upon axial movement of said pin member and said box member during radial expansion of the threaded tubular connection.

20. The expandable threaded tubular connection of claim 19 wherein the angled surface at the back of the box member and the angled surface at the pin nose end are in contact with each other after the axial gap is closed upon axial movement of said pin member and said box member during radial expansion of the threaded tubular connection.

21. The expandable threaded tubular connection of claim 20 wherein the pin nose end is forced radially outwardly when in contact with the angled surface of the box member after the axial gap is closed upon axial movement of said pin member and said box member during radial expansion of the threaded tubular connection.

22. The expandable threaded tubular connection of claim 21 wherein the closing of the axial gap upon axial movement of the pin member and the box member during radial expansion of the threaded tubular connection creates a seal between the pin surface and the box surface.

23. The expandable threaded tubular connection of claim 19 wherein the closing of the axial gap upon axial movement of the pin member and the box member during radial expansion of the threaded tubular connection creates a seal between the pin nose end and the back of the box member.

24. The expandable threaded tubular connection of claim 19 wherein the pin nose end and the back of the box member have matching shapes designed to mate upon axial movement of the pin member and the box member during radial expansion of the threaded tubular connection.

25. The expandable threaded tubular connection of claim 19 wherein the sealing element is made from an elastomeric material.

26. The expandable threaded tubular connection of claim 19 wherein the axial gap is sized to control the stresses imparted on the pin nose end and the back of the box member when the pin nose end and the back of the box member are forced into contact upon axial movement of the pin member and the box member during radial expansion of the threaded tubular connection.

27. A method of sealing a threaded connection for expandable tubulars upon radial expansion of the threaded connection comprising:
   providing a pin member on a first tubular segment, the pin member including interengageable thread means and a pin nose end;
   providing a box member in a second tubular segment, the box member including interengageable thread means suitable for threadedly engaging said pin member;
   inserting said pin member of said first tubular into said box member of said second tubular;
   creating an axial gap between said pin nose end and the back of said box member upon threadedly connecting said pin member with said box member;
   closing said axial gap between said pin nose end and the back of said box member by radially expanding said pin member and said box member.

28. The method of claim 27 further comprising providing a sealing element at the back of the box member such that the pin nose end engages the sealing element when the axial gap between said pin nose end and the back of said box member is closed.

29. A method of sealing a threaded connection for expandable tubulars upon radial expansion of the threaded connection comprising:
   providing a pin member on a first tubular segment, the pin member including interengageable thread means and a pin nose end, the pin nose end having an angled surface;
   providing a box member in a second tubular segment, the box member including interengageable thread means suitable for threadedly engaging said pin member and having an angled surface at the back of said box member;
   inserting said pin member of said first tubular into said box member of said second tubular;
   creating an axial gap between said pin nose end and the back of said box member upon threadedly connecting said pin member with said box member;
   closing said axial gap between said pin nose end and the back of said box member by radially expanding said pin member and said box member;
   forcing the angled surface on the pin nose end into engagement with the angled surface at the back of the box member.

30. The method of claim 29 further comprising providing a sealing element at the back of the box member such that the pin nose engages the sealing element when the axial gap between said pin nose end and the back of said box member is closed.

* * * * *